UNITED STATES PATENT OFFICE.

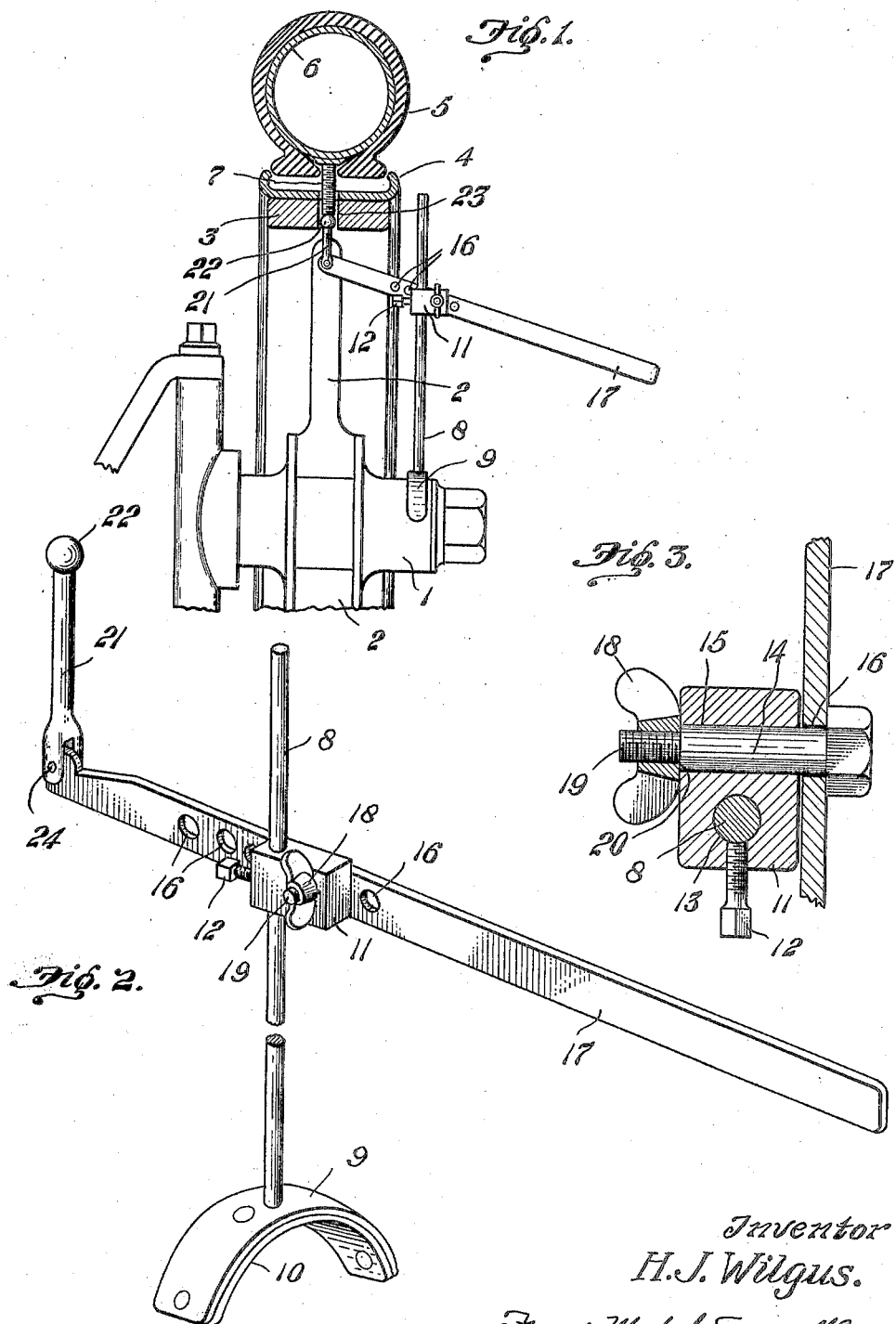

HAROLD J. WILGUS, OF CANTON, OHIO.

VALVE-STEM TOOL.

1,345,651.  Specification of Letters Patent.  Patented July 6, 1920.

Application filed August 1, 1919. Serial No. 314,775.

*To all whom it may concern:*

Be it known that I, HAROLD J. WILGUS, a citizen of the United States, residing at Canton, in the county of Stark and State of Ohio, have invented a new and useful Valve-Stem Tool, of which the following is a specification.

This invention relates to improvements in valve stem tools and has more especial reference to a tool designed to release the valve stem from the felly when it is desired to remove the tire.

The objects of the invention are to provide a device by means of which the removal of a pneumatic tire may be more easily effected by releasing the valve stem from the felly of the wheel.

A further object of the invention is to provide a tool of the character mentioned which consists of a lever adjustably mounted upon the upper end of a standard provided with means for engaging the valve stem of a tire, the lower end of the standard being provided with a yoke shaped to conform with the hub cap of the ordinary automobile wheel so that the latter may act as a support for the tool.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a side elevation of the tool, showing its application to an automobile wheel.

Fig. 2 is a perspective view of the tool; and

Fig. 3 is an enlarged sectional view through the pivotal connection between the post and the lever.

A practical embodiment of the invention is disclosed in the accompanying drawings forming a part of this specification in which similar numerals of reference indicate corresponding parts throughout the several views.

Referring first to Fig. 1 of the drawings, in which is shown a fragmentary portion of an automobile wheel, the numeral 1 indicates the hub, the numeral 2 the spokes, the numeral 3 the felly, 4 the rim, 5 the tire casing, 6 the inner tube and 7 the valve stem, all of which parts may be of any usual and well known construction as they form no part of the invention but are merely illustrated to show the application of the tool.

The standard 8 is preferably formed from a round rod as shown in the drawings and provided at its lower end with the curved yoke 9 arranged to conform to the cap of the wheel hub 1, and provided upon its inner side with a lining 10 formed of suitable fabric to prevent the yoke from marring the hub.

A block 11 is slidably mounted upon the upright 8 and arranged to be held in any adjusted position thereon by means of a set screw 12. The vertical passage 13 through which the upright is located is preferably formed near one side of the block 11 to permit of the lever being pivoted upon said block without interfering with the standard 8.

A shouldered bolt 14 is passed through a horizontal aperture 15 in the block and through any desired one of the apertures 16 in the lever 17, a thumb nut 18 being placed upon the reduced screw threaded portion 19 of the bolt and bearing against the shoulder 20 thereon, thus forming a suitable pivot for the lever 17.

By providing a plurality of apertures 16 in the levers 17 any desired adjustment of the lever may be obtained and by adjustably mounting the block 11 upon the standard 8, the tool may be adjusted for wheels of different diameters.

The inner or shorter end of the lever has pivoted thereon a rod 21 having a ball 22 at its upper extremity, this ball being slightly less in diameter than the diameter of the aperture 23 in the felly through which the valve stem is normally located. The rod 21 is pivoted at 24 to the lever 17.

In operation the yoke 9 is placed upon the hub as shown in Fig. 1 in the proper position to bring the standard 8 in the same radial plane with the valve stem 7. The rod 21 is then raised into a substantially vertical position, the ball 22 thereon being placed in engagement with the lower end of the valve stem. Downward pressure upon the outer end of the lever 17 will force the ball 22 upward through the aperture 23 in the felly forcing the valve stem entirely out of the aperture in the felly. When the lower end of the valve stem has cleared the rim, the stem may be bent to either side of the aperture through the felly preventing it from again entering the aperture after which the tool may be removed from the wheel and the tire removed in the usual manner.

It will of course be understood that the block 11 must be properly adjusted upon the standard 8 and the lever 17 be properly adjusted upon the block 11 to accommodate the particular wheel upon which the device is used before the tool is operated. These adjustments are very quickly and easily made, and of course are unnecessary, excepting in cases where the tool is used upon wheels of different dimensions, as when the tool is once adjusted for any particular size of wheel, it may be used continuously upon wheels of that size without any adjusting being necessary.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A valve stem tool, including a standard, a curved yoke upon the standard adapted to fit the hub of a wheel, a lever pivotally connected to the standard intermediate its ends and a valve stem engaging member provided upon one end of the lever.

2. A valve stem tool including a standard, a curved yoke upon the standard adapted to fit the hub of a wheel, a lever pivotally connected to the standard, intermediate its ends and a valve stem engaging rod pivotally connected to one end of said lever.

3. A valve stem tool, including a standard, a yoke upon the standard adapted to fit the hub of a wheel, a lever pivoted intermediate its ends upon the standard, a valve stem engaging rod pivoted upon one end of the lever and a ball upon the outer end of said rod.

4. A valve stem tool, including a standard, a yoke upon the standard adapted to fit the hub of a wheel, a block adjustably mounted upon the standard, a lever pivotally mounted intermediate its ends upon the block and a valve stem engaging rod pivoted to one end of the lever.

5. A valve stem tool, including a standard, a yoke upon the standard adapted to fit the hub of a wheel, a block adjustably mounted upon the standard, a lever pivoted intermediate its ends upon the block, means for adjusting the lever upon the block and a valve stem engaging rod pivoted to one end of the lever.

In testimony that I claim the above, I have hereunto subscribed my name.

HAROLD J. WILGUS.